(12) United States Patent
Cichon et al.

(10) Patent No.: US 11,113,858 B2
(45) Date of Patent: Sep. 7, 2021

(54) SYSTEM AND METHOD FOR DEEP COMPOSITING OF IMAGES IN WEB BROWSERS

(71) Applicant: Inventive Software, LLC, Ridgefield Park, NJ (US)

(72) Inventors: Rafal Cichon, Passaic, NJ (US); Marcin Grzybowski, Nisko (PL); Mateusz Wieczorek, Stalowa Wola (PL); Lech Stawikowski, Wroclaw (PL)

(73) Assignee: Inventive Software, LLC, Ridgefield Park, NJ (US)

( * ) Notice: Subject to any disclaimer, the term of this patent is extended or adjusted under 35 U.S.C. 154(b) by 0 days.

(21) Appl. No.: 16/926,892

(22) Filed: Jul. 13, 2020

(65) Prior Publication Data
US 2021/0241508 A1 Aug. 5, 2021

Related U.S. Application Data

(60) Provisional application No. 62/970,000, filed on Feb. 4, 2020.

(51) Int. Cl.
| | |
|---|---|
| *G06T 11/60* | (2006.01) |
| *G06T 15/00* | (2011.01) |
| *H04L 29/08* | (2006.01) |
| *G06F 3/0482* | (2013.01) |

(52) U.S. Cl.
CPC .............. *G06T 11/60* (2013.01); *G06T 15/00* (2013.01); *H04L 67/02* (2013.01); *G06F 3/0482* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 6,717,576 B1* | 4/2004 | Duluk, Jr. ............... | G06T 11/40 345/419 |
| 2015/0088977 A1* | 3/2015 | Monesson ............. | G06F 3/0484 709/203 |
| 2015/0154162 A1* | 6/2015 | Nijjer .................... | G06F 40/143 715/234 |
| 2018/0260668 A1* | 9/2018 | Shen ....................... | G06N 3/084 |
| 2020/0007760 A1* | 1/2020 | Yokokawa ............. | H04N 9/045 |
| 2021/0027470 A1* | 1/2021 | Lin .......................... | G06N 3/04 |

\* cited by examiner

*Primary Examiner* — YuJang Tswei
(74) *Attorney, Agent, or Firm* — John H. Choi & Associates

(57) ABSTRACT

A system and method display two-dimensional (2D) and cube mapped (360) map environments divided into many different parts that are changeable over a network by end-users in real-time. Large portions of the images are filled with texture layers of different shapes and variants, so that a user can easily switch between the large portions. All of the large portions are saved on one or more render servers as a pack of digital images, and the end-users can communicate with the render servers to download the necessary portions of the images exactly when such portions are needed. The system and method utilize a set of rules that adaptively chooses the best way, in terms of computer performance, of composing the map environment and of changing the shapes and variants of the layers depending on a given environment.

16 Claims, 16 Drawing Sheets

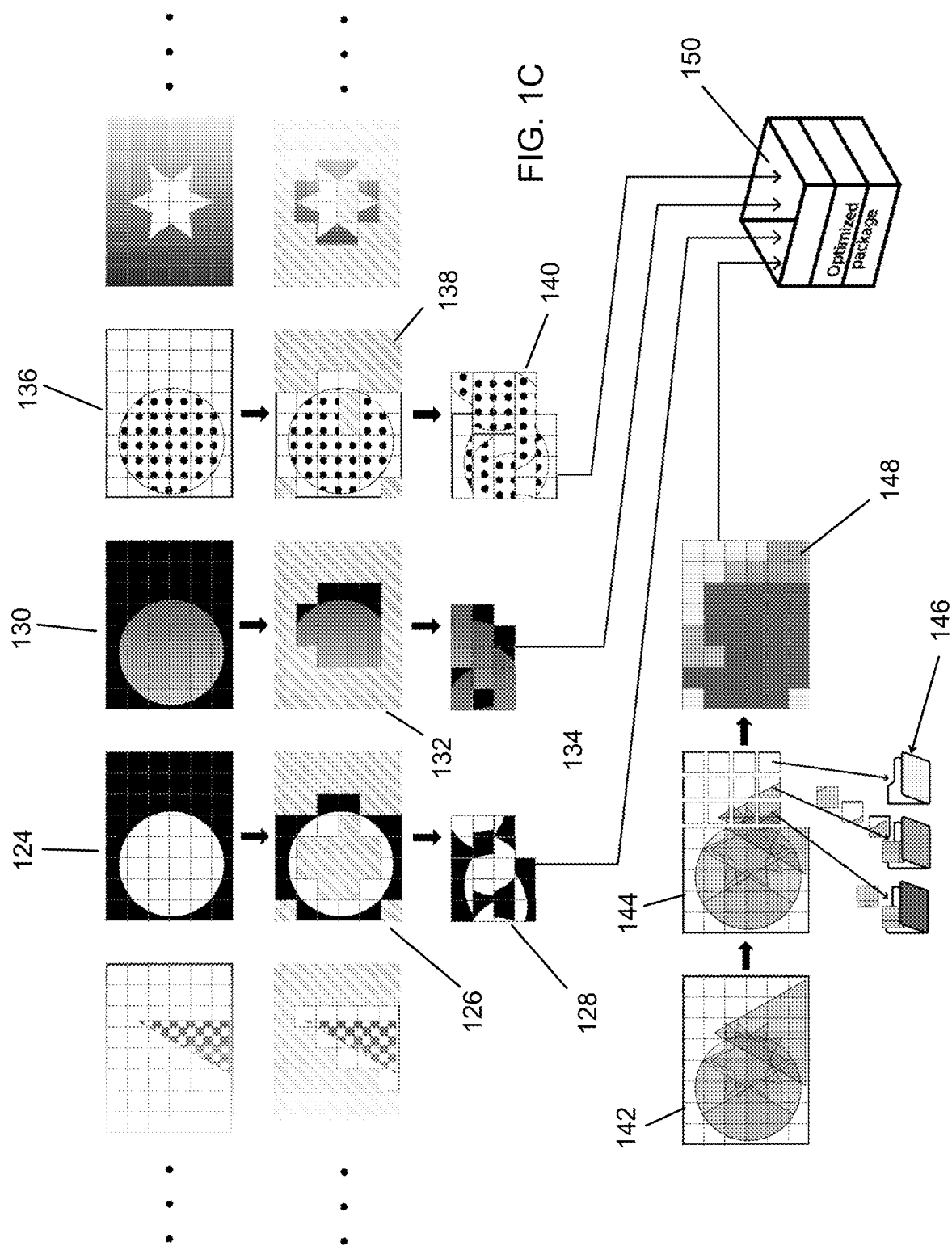

SYSTEM AND METHOD FOR DEEP COMPOSITING OF IMAGES IN WEB BROWSERS

CROSS-REFERENCE TO RELATED APPLICATION

This application claims priority to U.S. Provisional Application No. 62/970,000, filed on Feb. 4, 2020, which is incorporated by reference in its entirety.

FIELD

The present disclosure relates to graphical processing and in particular to a system and method for deep compositing of images in web browsers.

BACKGROUND

Web browsers are capable of displaying interactive visualizations of objects in an image to end-users. However, for highly detailed images, web browsers in the prior art have been unable to quickly and accurately render such images, due to their complexity and their high amounts of image data to be processed and rendered.

One way in the prior art for rendering image data is by integrated graphics generation, which involves the use and integration of a graphics processing unit (GPU) of a device associated with the end-user which also implements such image rendering in the web browser executed by the end-user device. Accordingly, the final resolution of image data in a web browser is entirely dependent on the hardware of the end-user. As a result, if the end-user is using an older or lesser model GPU, then the resolution of images will be limited. The responsiveness of such prior art image processing methods varies widely depending on the actual hardware which the end-user employs. Such variation leads to the potential for large disparity in the end result of the image generation and rendering, depending solely on the existing hardware.

Dynamic scenes are likewise limited by existing hardware. The prior art method allows for multiple axes, but because of hardware limitations, it may not be possible to dynamically shift between each individual axis. Furthermore, all background work is done on the hardware of the device of the end-user, with few resources, if any, being stored on a host server. The overall limitation of the prior art method is the sole dependence on the end-user's existing hardware. The worse the existing hardware is, the less likely that the prior art method of image processing will even be able to function.

In addition, the final lighting in such prior art image processing is either created using a static lighting system or dynamic lighting system. If a product uses a dynamic lighting system and the GPU does not meet the necessary minimum requirements, then the quality will be drastically poor with regard to lighting. Also, because of the complexity required in such prior art image processing, and because the complexity may be altered for geometric needs, the prior art systems are unable to generate images with sufficient complexity to properly capture the individual image complexity.

Moreover, the resolution of the textures in the prior art method of image processing depends on both the Internet connectivity hardware of the end-user's device as well as the physical specifications of the hardware of the end-user's device for rendering images in a web browser.

Accordingly, to perform deep compositing, rendering, and display of images in web browsers executed by a device of an end-user, systems and methods of the prior art are deficient and even unable to perform such deep compositing.

A need exists for improved deep compositing, rendering, and displaying of images in web browsers executed by a device of an end-user which is not dependent or limited by the hardware of the device.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In the present invention, a system and method display two-dimensional (2D) and cube mapped (360) map environments divided into many different parts that are changeable over a network by end-users in real-time. Large portions of the images are filled with texture layers of different shapes and variants, so that a user can easily switch between the large portions. All of the large portions are saved on one or more render servers as a pack of digital images, and the end-users can communicate with the render servers to download the necessary portions of the images exactly when such portions are needed. The system and method utilize a set of rules that adaptively chooses the best way, in terms of computer performance, of composing the map environment and of changing the shapes and variants of the layers depending on a given environment.

The system and method of the present invention provide a hybrid and adaptive procedure for the preparation and rendering of graphics. For example, using the system and method of the present invention, resolution of the medium can be very high because user devices do not need to download whole images from a server or from the Internet with each configuration change. Instead, renderings are handled by a rendering farm as opposed to relying solely on the computer hardware of the end-user. In addition, the lighting of images is improved, and dynamic lighting may be presented by implementing equations of composition at the user device remote from a server. Images are generated offline, before interaction takes place. The complexity of the geometry of an image is not limited by the capabilities of the user devices, and responsiveness is very high because the system and method of the present invention is not limited to the performance of a GPU in the user device, but instead uses the processing power of a rendering farm. Therefore, there is no need for the user device to download an entire image to render the image. Dynamic interaction is also very high due to the composition of the layers by the user device, allowing for presentations with very many options at different distances from a camera. Furthermore, infrastructure requirements of the system and method are low, such that the amount of disk space used for storing rendered images increases generally linearly with the number of variants of objects in an image.

In one embodiment, the present invention provides a system comprising: a workstation including a first processor executing graphical software instructions for receiving an input, for generating image data from the received input, and for transmitting the image data; a render server including a second processor for: receiving the image data; generating a graphical file from the received image data including: deriving distinct data from an alpha image, a z-depth image, and red-green-blue (RGB) variants of the image data; minimizing the distinct data; deriving shading data from the image data; and combining the minimized distinct data and the shading data to generate an optimized data package in the graphical file; and transmitting the graphical file; and a user device remote from the render server, wherein the user device includes a third processor and a display operating a browser, wherein the third processor receives the graphical file and renders the image data in the browser using the graphical file. The user device is a personal computer, a mobile computing device, or a wearable viewing device. The workstation includes a memory storing a plurality of image shapes; and wherein the input includes a selection of an image shape from the plurality of image shapes. The image data specifies a plurality of layers including a plurality of selected image shapes, with at least one selected image shape disposed in a corresponding layer. The user device further comprises: a compositing sub-system for rendering the image data in the browser by reconstructing, from the optimized data package, the plurality of layers with the plurality of selected image shapes disposed in corresponding layers. Each of the plurality of selected image shapes has a respective alpha image, a respective z-depth image, and a respective plurality of RGB variants.

In another embodiment, the present invention provides a user device comprising: a first processor remote from a render server for receiving a graphical file from the render server, wherein the render server includes a second processor for: receiving image data; generating the graphical file from the received image data including: deriving distinct data from an alpha image, a z-depth image, and red-green-blue (RGB) variants of the image data; minimizing the distinct data; deriving shading data from the image data; and combining the minimized distinct data and the shading data to generate an optimized data package in the graphical file; and transmitting the graphical file; and a display operating a browser; wherein the first processor receives the graphical file and renders the image data in the browser on the display. The user device is a personal computer, a mobile computing device, or a wearable viewing device. The render server is operatively connected to a workstation which includes: a memory storing a plurality of image shapes; and an input device for receiving an input which includes a selection of an image shape from the plurality of image shapes. The image data specifies a plurality of layers including a plurality of selected image shapes, with at least one selected image shape disposed in a corresponding layer. The first processor further comprises: a compositing sub-system for rendering the image data in the browser by reconstructing, from the optimized data package, the plurality of layers with the plurality of selected image shapes disposed in corresponding layers. Each of the plurality of selected image shapes has a respective alpha image, a respective z-depth image, and a respective plurality of RGB variants.

In a further embodiment, the present invention provides a method comprising: executing graphical software instructions on a first processor of a workstation; receiving an input through an input device of the workstation; generating image data from the received input using the first processor; transmitting the image data from the first processor; receiving the image data at a second processor of a render server; generating a graphical file from the received image data using the second processor, including: deriving distinct data from an alpha image, a z-depth image, and red-green-blue (RGB) variants of the image data; minimizing the distinct data; deriving shading data from the image data; and combining the minimized distinct data and the shading data to generate an optimized data package in the graphical file; transmitting the graphical file using the second processor; receiving the graphical file of a user device remote from the render server, wherein the user device includes a third processor and a display operating a browser; and rendering, using the third processor, the image data in the browser using the graphical file. The method further comprises storing a plurality of image shapes in a memory of the workstation; and wherein the input includes a selection of an image shape from the plurality of image shapes. The image data specifies a plurality of layers including a plurality of selected image shapes, with at least one selected image shape disposed in a corresponding layer. The method further comprises rendering the image data in the browser of the user device using a compositing sub-system of the third processor by reconstructing, from the optimized data package, the plurality of layers with the plurality of selected image shapes disposed in corresponding layers.

BRIEF DESCRIPTION OF DRAWINGS

The foregoing summary, as well as the following detailed description of presently preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 1C is a representation of the layers of objects being pre-composited;

Figure 1:
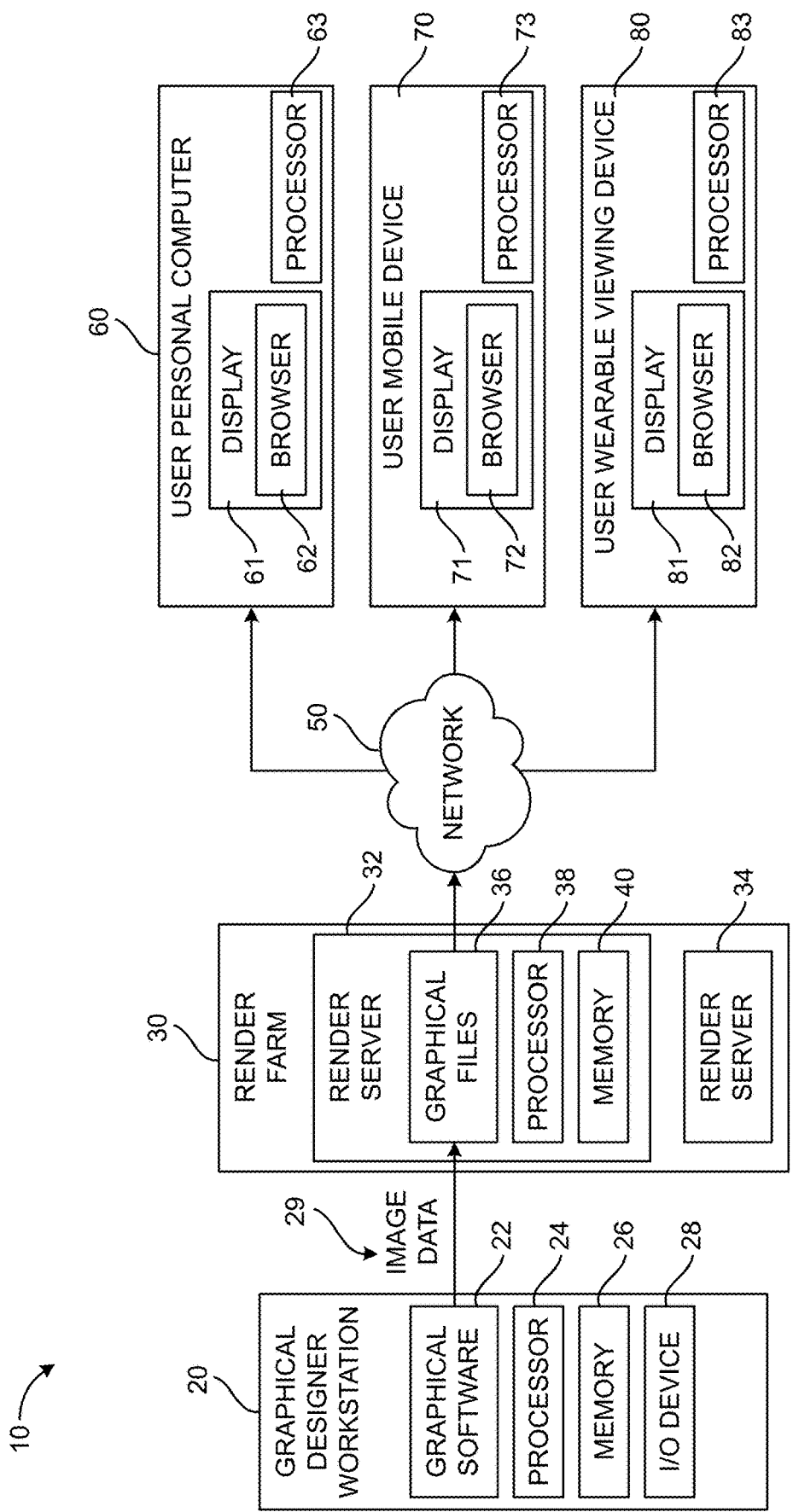
FIG. 1 is a schematic of the overall system of the present invention.

To facilitate an understanding of the invention, identical reference numerals have been used, when appropriate, to designate the same or similar elements that are common to the figures. Further, unless stated otherwise, the features shown in the figures are not drawn to scale, but are shown for illustrative purposes only.

DETAILED DESCRIPTION

Certain terminology is used in the following description for convenience only and is not limiting. The article "a" is intended to include one or more items, and where only one item is intended the term "one" or similar language is used. Additionally, to assist in the description of the present invention, words such as top, bottom, side, upper, lower, front, rear, inner, outer, right and left may be used to describe the accompanying figures. The terminology includes the words above specifically mentioned, derivatives thereof, and words of similar import.

As shown in FIG. 1, the system 10 and method of the present invention include a graphical designer workstation 20 which generates images to be processed by a render farm 30 for distribution over a network 50 to individual user devices 60, 70, 80 for the display of images on respective displays 61, 71, 81 in respective browsers 62, 72, 82. Each user device 60, 70, 80 includes a respective processor 63, 73, 83. The processors 63, 73, 83, as well as the workstation processor 24 and the render farm processor 38, may be any known processor such as a microprocessor. The browsers 62, 72, 82 may be any known browsers.

The graphical designer workstation 20 includes predetermined graphical software 22, a processor 24, a memory 26, and an input/output (I/O) device 28 such as a keyboard, mouse, and display, optionally with a graphical user interface (GUI), allowing the graphical designer workstation 20 to receive an input from a graphical designer to generate such images. The graphical software 22 includes a set of instructions for execution by the processor 24, and the graphical software 22 may be stored in the memory 26 and/or stored in the processor 24 for execution by the processor 24 to generate image data 29. The image data 29 is then transmitted to the render farm 30 using a transmitting device implementing any known communication protocol.

The render farm 30 receives and processes the image data 29 through a receiving device implementing any known communication protocol. The render farm 30 includes a plurality of render servers 32, 34, each of which stores the received image data 29 in respective graphical files 36. Each render server 32, 34 also respectively includes a rendering processor 38 and a memory 40 for storing and processing the graphical files 36. The image data 29 is sent from the graphical designer workstation 20 to a pre-processing system of the render farm 30, using an application programming interface (API), to generate the graphical files 36, which may then be transmitted to be distributed over the network 50 to the user devices 60, 70, 80.

Each of the user devices 60, 70, 80 includes a respective processor 63, 73, 83, a respective memory, and a respective display 61, 71, 81, with the respective browser 62, 72, 82, executed by a corresponding processor 63, 73, 83 and displayed in the corresponding display 61, 71, 81. One or more of the user devices 60, 70, 80 receives the graphical file 36, and renders the image data 29 as an image on a respective display 61, 71, 81 in the respective browsers 62, 72, 82 using the graphical file 36.

The user device 60 may be any personal computer (PC) in the form of stand-alone systems such as workstations, terminals, and other such stand-alone devices and systems known in the art, and capable of rendering and displaying images on the display 61 in the browser 62. The user device 70 may be any mobile computing device such as a mobile phone, a smart phone, a laptop, a tablet, or other such mobile computing devices known in the art, and capable of rendering and displaying images on the display 71 in the browser 72. The user device 80 may be any wearable viewing device such as a headset, an eyepiece, an eyeglass-attachable display, or other such wearable viewing devices known in the art, and capable of rendering and displaying images on the display 81 in the browser 82 for use in displaying virtual reality (VR) images, augmented reality (AR) images, mixed reality images, computer-mediated reality images, etc.

Figure 1A:
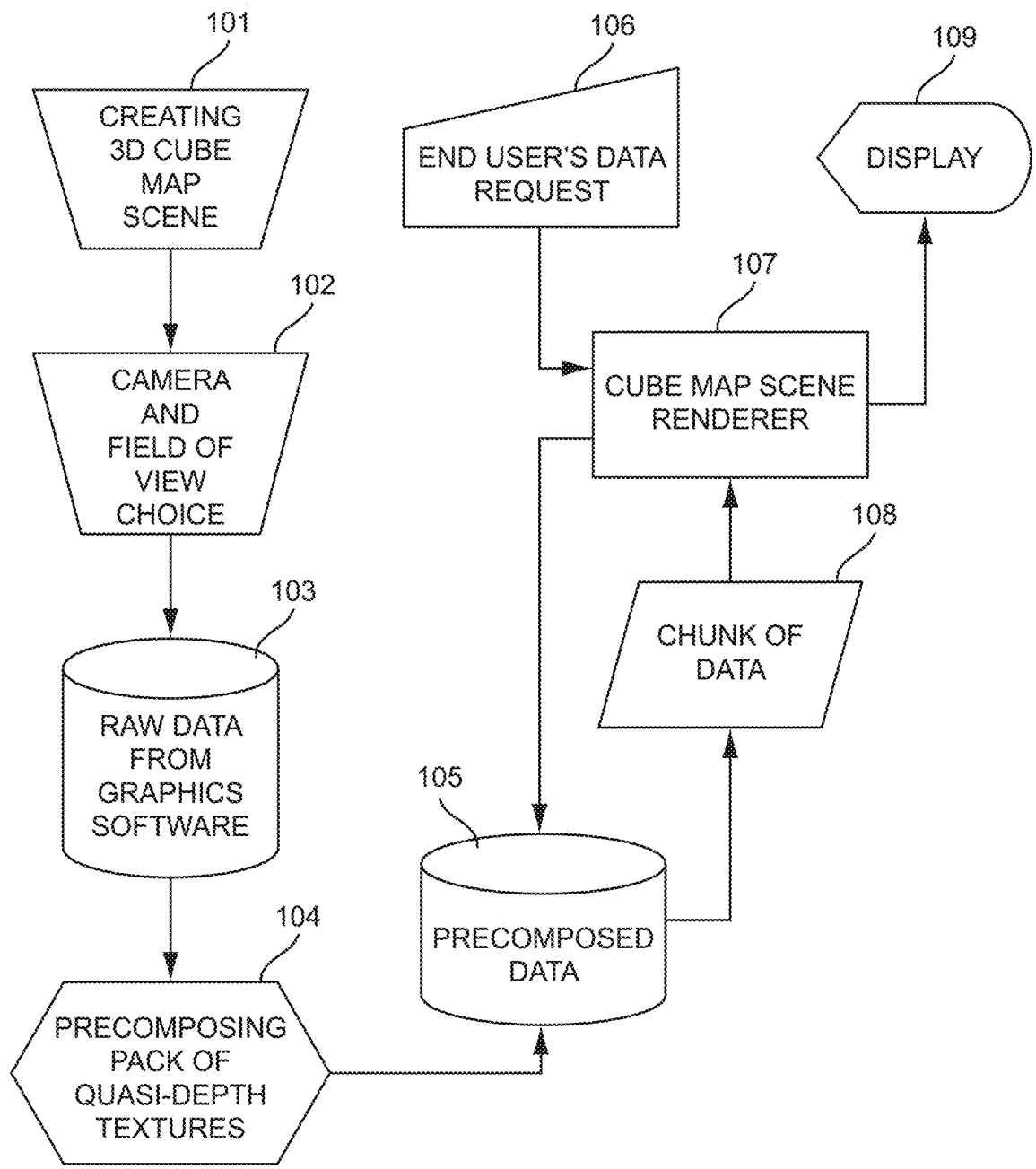
FIG. 1A is a flow diagram of operation of the present invention.

FIG. 1A is a flow diagram of operation of the present invention. Using the graphical software 22 in FIG. 1, which may be any software capable of producing bitmaps, the graphical designer creates a environmental map or visualization of a scene 110 in step 101, as shown in FIG. 1D, in which layers 112, 114, 116 have objects positioned in a 3D cube, or alternatively a rectangular cuboid or parallelepiped, in space. In an example embodiment, the graphical software 22 may use or incorporate known graphics-generating programs or applications such as 3DS MAX™ or MAYA™, to generate a raw pack of images corresponding to a 3D visualization of a specified space in the cube map. The graphical software 22 may be a plug-in application for use with such known graphics-generating programs. For example, the plug-in for 3DS MAX™ is written in C++, the plug-in for PHOTOSHOP™ is written in Javascript, and the plug-in for BLENDER™ is written in Python. The graphical software 22 also generates metadata for use by the render farm 30 to schedule the rendering of needed layers from among the layers 112, 114, 116 of the image.

The metadata includes information about the manner of partitioning a scene into different layers and different variants, as well as information about variants of materials. Custom, arbitrary metadata can also be attached to each layer and variant. Localization of possible camera views is also included in the metadata. Rendering software executed by the render servers 32, 34 uses the metadata to render parts of scene in different variants. The information to be stored as metadata may be specified by a user of an application, such as the graphical designer using the graphical software 22, which may be a plug-in, operated by the processor 24 by using the GUI settings and GUI capabilities of the plug-in.

Referring to FIG. 1A, the choice of the camera location and the field of view are set by the graphical designer in step 102, for example, from the point of view of a camera that is placed in the center of the cube map. Then raw data from the graphical software 22 is generated in step 103 which specifies the raw pack of images. Parameters that describe a raw pack are color, alpha, and z-depth. The color parameter specifies the red-green-blue (RGB) colors of each object in the cube map, the alpha parameter specifies the transparency of each object, and the z-depth specifies the position of each object relative to the camera. Depending on whether a 2D image or a 3D image is processed, the raw pack of images includes only the data corresponding to a rectangular projection on a plane for a 2D image, or a rectangular projection on the cube map for a 3D image.

Figure 1B:
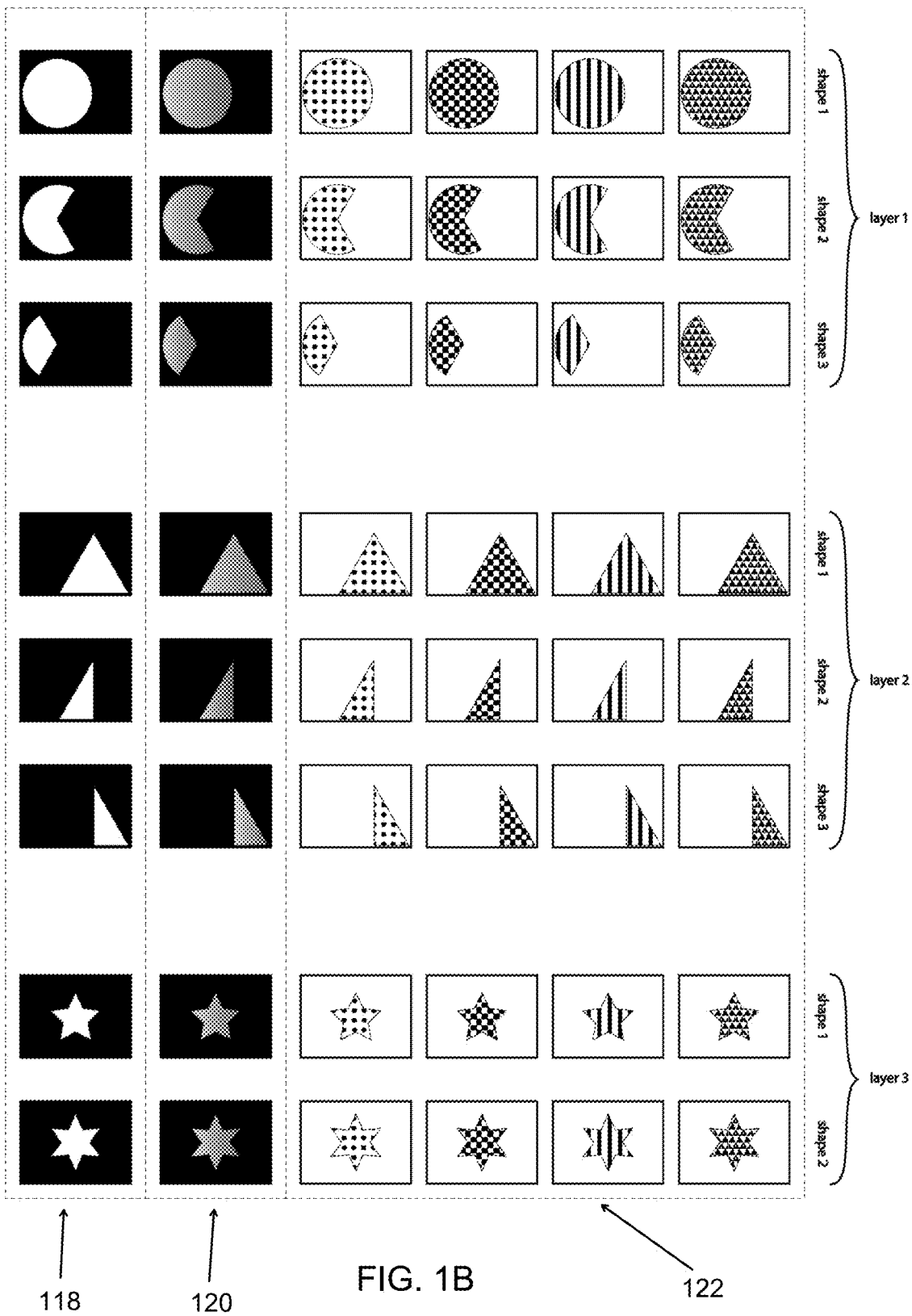
FIG. 1B is a representation of image data having a plurality of layers of objects.
Figure 1D:
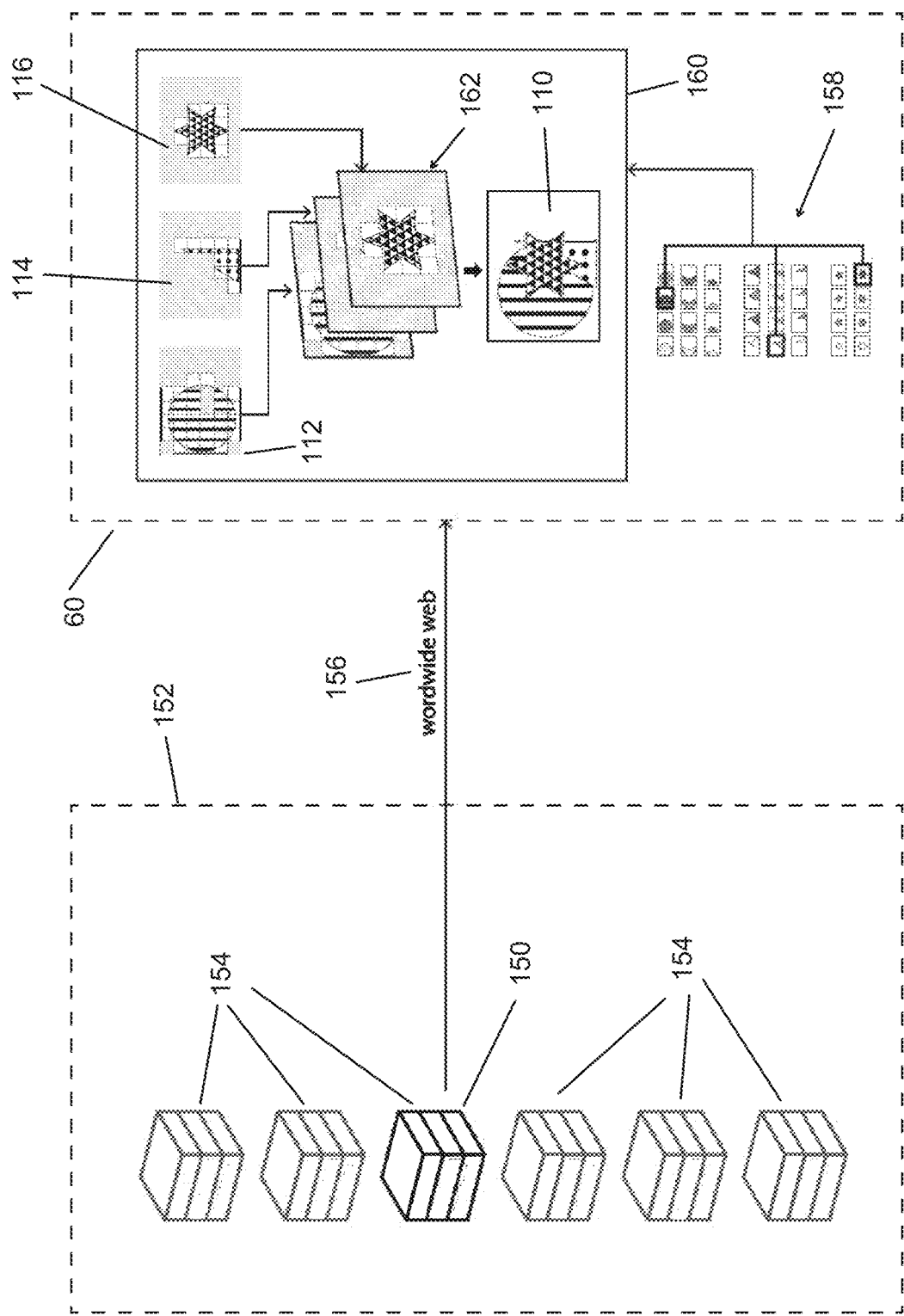
FIG. 1D is a representation of the layers of objects being composited.

Referring to FIG. 1B, numerous shapes are available to a user in an input package at the graphical designer workstation 20 to compose an image or scene in step 101 in FIG. 1A. Each image or scene has a plurality of layers, such as the image 110 composed from layers 112, 114, 116 shown in FIG. 1D. In FIG. 1B, each of the numerous shapes have an alpha or alfa image 118, a z-depth image 120, and a plurality of RGB variants 122, and are arranged to be positioned in respective layers 112, 114, 116, corresponding respectively to Layer 1, Layer 2, and Layer 3, as shown in FIG. 1B.

Referring to FIG. 1C, the system 10 then performs pre-composing, that is, pre-compositing, of the input data in step 104 in FIG. 1A. As shown in FIG. 1C, for each shape in each layer, the alpha/alfa image 124 is processed by slicing the image 124 and discarding unused parts, to derive and generate an image 126 of just the distinct image portions, and such distinct image portions are then sliced to be a minimal set 128 of image portions. Similarly, the z-depth image 130 is processed by slicing the image 130 and discarding unused parts, to derive and generate an image 132 of just the distinct image portions, and such distinct image portions are then sliced to be a minimal set 134 of image portions. In addition, the RGB variant 136 is processed by slicing the image 136 and discarding unused parts, to derive and generate an image 138 of just the distinct image portions, and such distinct image portions are then sliced to be a minimal set 140 of image portions. For each pixel, visibility in a certain configuration of layers is determined after discarding unused pixels. Every possible combination of remaining pixels and areas of the image are recovered. The recovered images are compressed using compression algorithms known in the art.

Separately, the image 110 in FIG. 1D is processed to be a set of blocks 142, and such blocks of image data and shading 144 are individually stored in file folders 146. A two-dimensional array of shaded blocks 148, representing the degree of occupancy by layers in each block 144 of the set 142, is then derived and created from the blocks 144.

Finally, the sets 128, 138, 140 of image portions and the array 148 are processed and combined into an optimized package 150 of image data as the pre-composed data 105 in FIG. 1A. The package 150 is optimized both by compression and by reducing the amount of transmitted data, as mentioned above and in more detail below.

Referring to FIG. 1D, the generated optimized package 150 is stored on a remote server 152, such as a render server 32, 34 or other servers remote from the user personal computer 60 or other personal devices 70, 80 associated with the user, as shown in FIG. 1. The optimized package 150 is stored on the remote server 152 with other generated optimized packages 154. Once one of the optimized packages 150, 154, such as the package 150, is requested by, for example, the user personal computer 60, the requested package 150 is sent as the graphical file 36 to the user personal computer 60 over a network, such as the network 50 in FIG. 1, which may be the Internet, or over the World Wide Web 156.

At the user personal computer 60, the requested optimized package 150 is processed along with a variant specification 158 by a compositing sub-system 160 included in the respective processor 63. The variant specification 158 is created by the graphics designer workstation 20 based on the shapes selected from the input package structure in FIG. 1B, and which indicates which shape variant is in each layer. The requested optimized package 150 is used in compositing by a plug-in of the browser 62 in FIG. 1. Using the compositing sub-system 160, the layers 112, 114, 116 are reconstructed and arrayed as a set 162 of layers, which are combined to form the rendered image 110 displayed in step 109 in FIG. 1A in one or more displays 61, 71, 81 on one or more browsers 62, 72, 82, respectively, of the user devices 60, 70, 80, respectively, in FIG. 1.

Referring again to FIGS. 1 and 1A, pre-composing of a raw pack of quasi-depth textures is performed in step 104, and pre-composed data are generated, in step 105, as the graphical files 36 which are available for rendering by the render servers 32, 34 of the render farm 30. In response to an end-user's data request for displaying an image in step 106 on a display 61, 71, 81, respectively, in the corresponding browser 62, 72, 82 of the end-user, the render servers 32, 34 of the render farm 30 render the cube map scene in step 107 by requesting a relevant chunk of data in step 108 from the pre-composed data 105 in the graphical files 36. The render farm 30 then sends the appropriate rendered graphical files 36, in the form of the requested package 150 in FIG. 1D, over the network 50 to the browser 62, 72, 82 corresponding to the requesting end-user, for processing by the compositing sub-system 160, which is a plug-in of the browser 62, 72, 82, to generate the rendered image 110 for display by a corresponding display 61, 71, 81, through the browser 62, 72, 82, respectively, in step 109.

Figure 2:
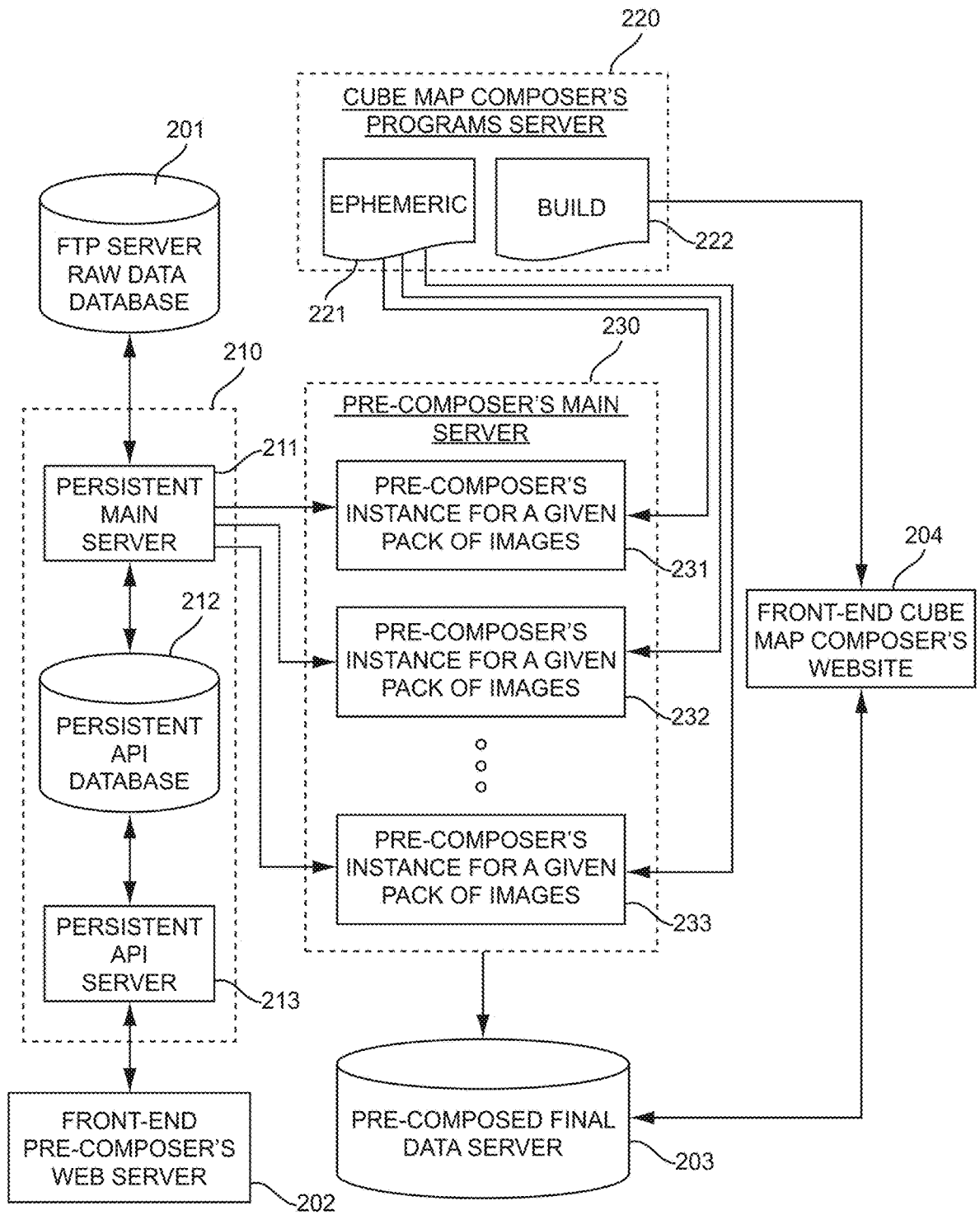
FIG. 2 is a schematic of a post-processing system of the present invention.

FIG. 2 is a schematic of a post-processing system of the present invention, for post-processing a raw pack of images, and then pre-compositing such post-processed images. The post-processing system in FIG. 2 may be part of the server farm 30. The raw data in the graphical files 36 is stored in a database 201, which may be in the memory 40 of a render server 32, 34 as shown in FIG. 1. Referring to FIG. 2, the raw data is stored in the database 201 in a file transport protocol (FTP) server. The raw data is then transferred to a persistent sub-system 210 which includes a persistent main server 211, a persistent application programming interface (API) database 212, and a persistent API server 213. The persistent sub-system 201 is connected to a front-end pre-composer's web server 202, which stores the website data for constructing the front-end of the website viewable in the user browsers 62, 72, 82, and in which the 2D or 3D graphics will be generated and displayed to the user.

The persistent sub-system 210 is used to alleviate the pre-compositing processes, since such pre-compositing processes can be very computationally intensive. To allow processing on demand, parts of the persistent sub-system 201 can be dynamically allocated, so their role in the pre-compositing system is ephemeric. To manage the process of scheduling tasks of ephemeric devices, the persistent main server 211 operates continually.

The server farm 30 may also include a cube map composer's programs server 220 which stores programs and/or APIs which interact with the graphical software 22. For example, an ephemeric or ephemeral/temporary program 221 is used, with data from the persistent main server 211, to generate at least one pre-composer's instance 231, 232, 233 for a given pack of images in a pre-composer's main server 230, which may also be part of the server farm 30 for pre-composing the raw pack of images. The pre-composer's main server 230 is thus able to apply extensive use of parallel computing methods that make it possible to effectively use one or more GPUs for numeric operations which significantly increases the speed of the post-processing of the raw pack of images.

The cube map composer's programs server 220 also includes a build program 222 for building a front-end cube map composer's website 204. The pre-composer's instances 231, 232, 233 are then used by a pre-composed final data server 203, which, in conjunction with the build program 222, builds the front-end cub map composer's website 204 for displaying rendered images in the respective browsers 62, 72, 82. The images are rendered by the render farm 30 in a High Dynamic Range (HDR) rendering format using logLUV TIFF encoding, which enables color correction of the rendered images.

Figure 3:
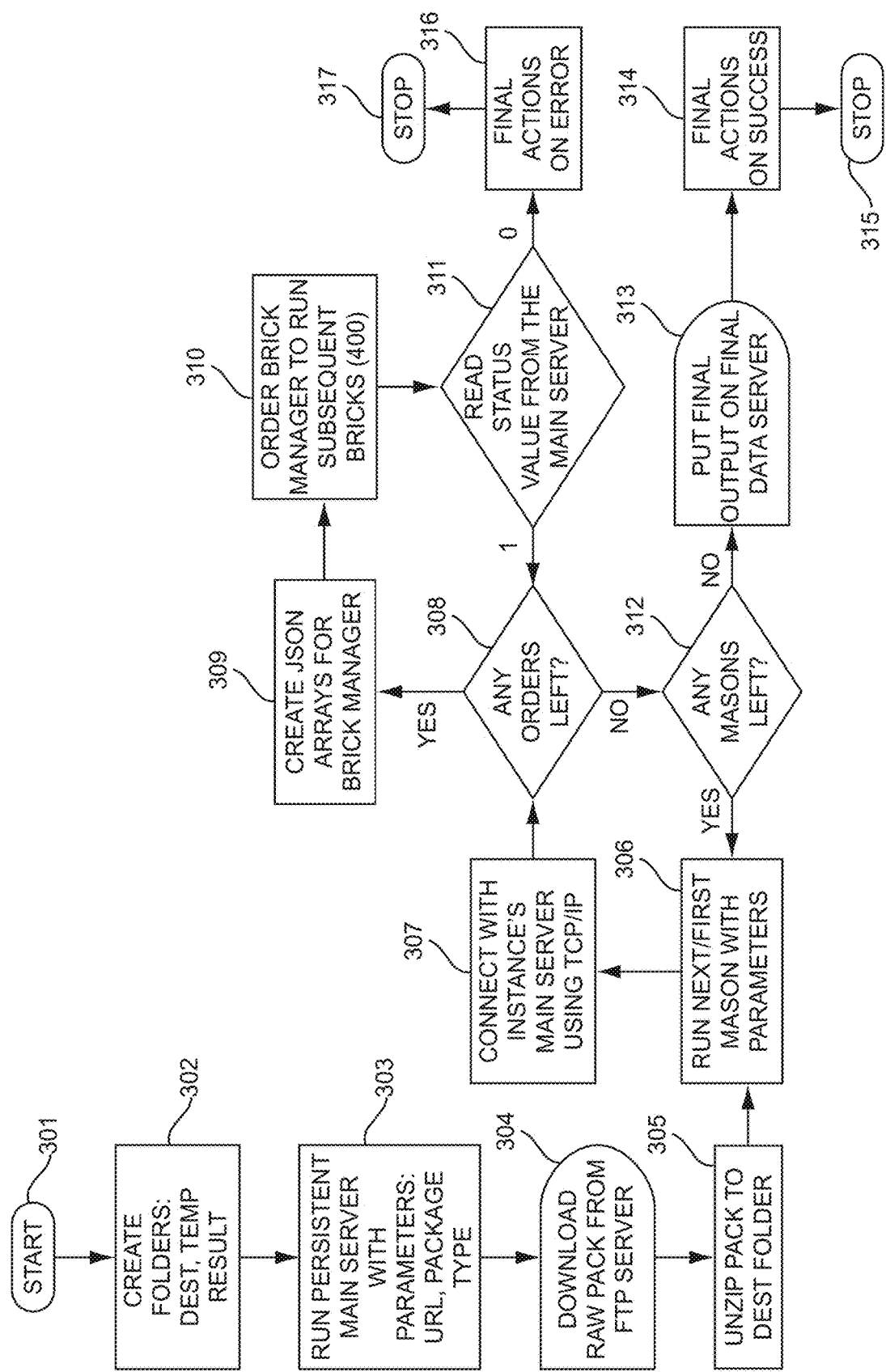
FIG. 3 is a flowchart of a method for managing bricks.

FIG. 3 is a flowchart of a method for managing bricks. Pre-compositing of single package can be divided into main tasks, also known as masons, and each mason can be divided into possibly hundreds of smaller tasks known as bricks, such that each brick is single process. The method starts in step 301, and creates folders Dest.temp and Result in step 302. In step 303, the method runs the persistent main server 211 with parameters URL and Package Type. The method then downloads the raw pack from the FTP server 201 in step 304, and unzips the raw pack to a destination folder Dest in step 305. The method then runs a first mason with parameters in step 305, and connects with the instance's main server 230 using the Transmission Control Protocol and Internet Protocol (TCP/IP) in step 307. The method checks whether any orders are left in step 308, and if so, the method creates JavaScript Object Notation (JSON) arrays for a brick manager in step 309. The method orders the brick manager to run subsequent bricks in step 310, as described in connection with the method in FIG. 4, and the method reads a status value from the main server in step 311. Generally, bricks and masons are parts of a scheduling system dealing with the speeding up of a pre-compositing process.

If the status value is 1 in step 311, the method loops back to step 308 to check if any orders are left, and if so, repeats steps 309-311. However, if no orders are left in step 308, the method checks if any masons are left in step 312. If so, the method loops back to repeat steps 306-308 for a next mason. However, if no masons are left in step 312, a final output is put on a final data server in step 313, final actions on success are performed in step 314, and the method stops in step 315. Referring back to step 311, if the status value is zero, then final actions on error are performed in step 316, and the method stops in step 317.

Figure 4:
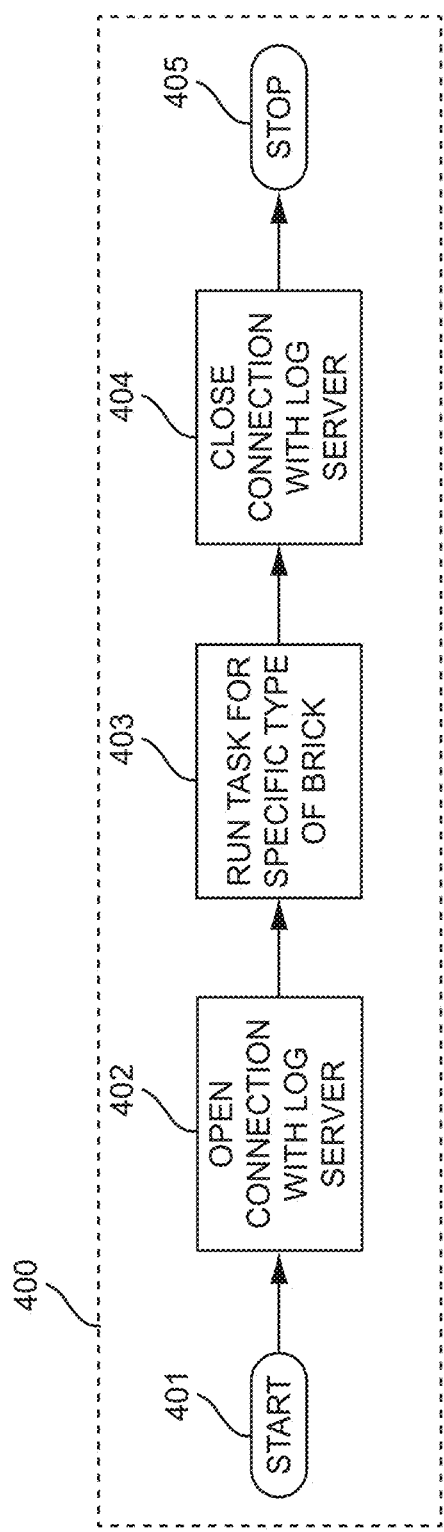
FIG. 4 is a flowchart of a method for processing a single brick.

FIG. 4 is a flowchart of a method 400 for processing a single brick, which starts in step 401, and which opens a connection with a log server in step 402. The method then runs a task for a specific type of brick in step 403, closes the connection with the log server in step 404, and stops in step 405. The purpose of the log server is to collect all logs from ephemeric instances. Such logs can be used for diagnostic purposes, and to provide feedback for instances which prepare packages. Logs can be accessed by a web interface of the persistent main server 211.

Figure 5A:
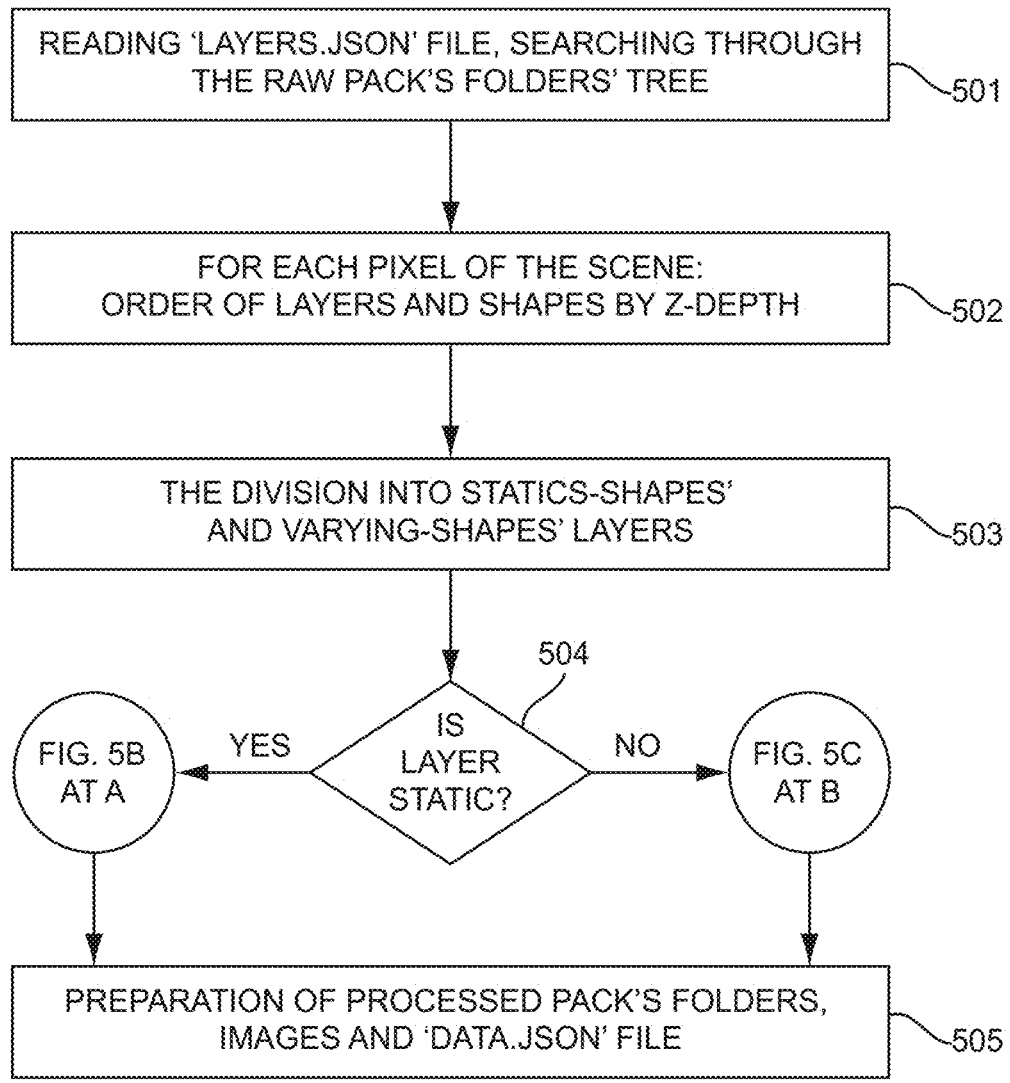
FIG. 5A is a flowchart of a method for creating pre-composed packs of images.

FIG. 5A is a flowchart of a method for creating pre-composed packs of images using the pre-composing main server 230. In step 501, the method reads a Layers.JSON file, and searches through a tree of folders of the raw pack. Then for each pixel of the scene, the layers and shapes are ordered by their z-depth in step 502. The layers are then divided in step 503 into static-shape layers and varying-shape layers, for example, in FIG. 1C. Referring to FIGS. 1B-1D, a layer is a static layer if the layer has only one specific shape. However, a layer is a varying layer if the layer has many possible shapes, or alternatively, the layer may have a shape which varies over time.

Figure 6:
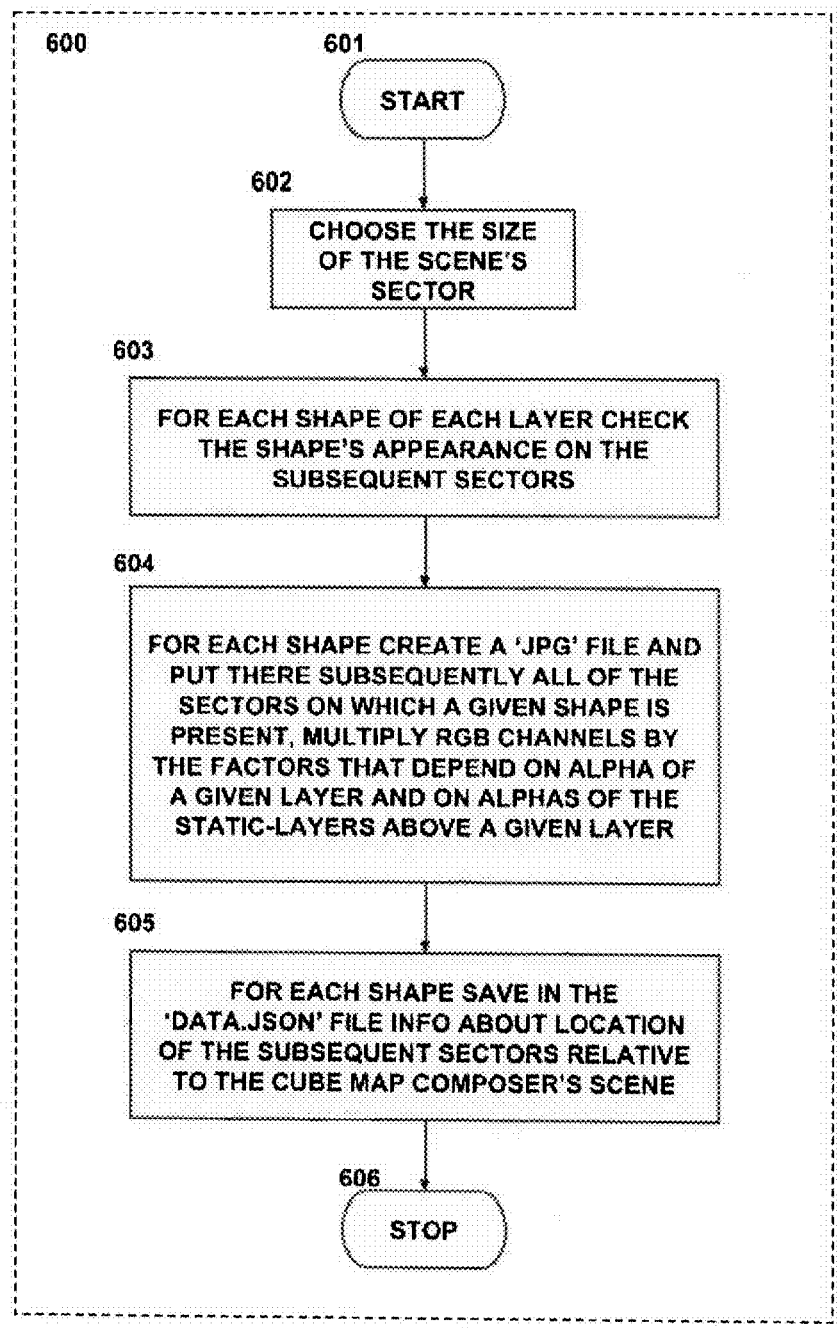
FIG. 6 is a flowchart of a method for preparing images for varying layers.

Depending on the layer type, as determined in step 503 in FIG. 5A, the corresponding image, representing the objects in the scene 110 composed of the layers 112, 114, 116, is changed by multiplying RGB colors by factors depending on each layer's own alpha channel values and on the alpha channel values of the other layers according to predetermined mathematical formulas, as described in step 604 of FIG. 6.

The predetermined mathematical formulas are described below, which depend on the various classes of each sector. A first sector class specifies a sector of the scene that contains static layers only, in which each of the static layers has one variant. In this case, alpha compositing is performed during the pre-composing process, because layers are present which never will be changed due to being static, and so having constant RGB data. Accordingly, one image is processed for such a sector in the first sector class. For this situation, the alpha compositing equation is used in the easiest way: let the layer with index i be $L_i$, that has an alpha value A, in the range [0, 1] (in which the value 0 means total transparency), a z-depth value $Z_i$ in the range [0, 1] (in which the value 0 means infinite distance from a viewer), and a RGB tuple $C_1$ in the range of the Cartesian product from [0, 1]×[0, 1]×[0, 1] (where the value 0 means total absence of a particular component={red, green, blue}).

The layers may be sorted based on their z-depth values, for example, in increasing order, so that a sequence of n layers is formed in which the first layer has an index 0, the next layer has an index 1, and so on until the last layer has an index of n−1. In this case, based on known alpha compositing theorems, the following recursive formulas are obtained:

$$F_i = A_i \cdot C_i + (1-A_i) \cdot F_{i-1}, \text{ in which}$$

i={1, 2, . . . , n−1} and $F_0=C_0$ and $A_0=1$.

Accordingly, to obtain a final color after the alpha compositing process on layers 0 through n−1, the system must recursively compute the value $F_{n-1}$.

A second sector class specifies a scene that contains static layers only which can have more than one variant. In this case, the alpha pre-compositing process is performed for each layer, that depends on multiplying RGB data of variants for the layer with its alpha and for each layer that is situated above the particular layer, and multiply with a factor (1−other_alpha), where other_alpha is an alpha of the layer above. Accordingly, the system only has to perform a sum of previously pre-composed RGB data using a GPU and a WebGL library to obtain the results. For the second sector class, the basic alpha compositing equation described above is modified as follows: with all three layers sorted based on their increasing z-depth values, a sequence of layers is obtained in which the first layer will have the index 0, the next layer will have the index 1, and the last layer will have the index 2. In this case, based on alpha compositing theorems, the formulas below are processed in which $F_i$ is a final color applied to a layer with an index i on the background performed from layers 0, 1, 2:

$$F_i = A_i \cdot C_i + (1-A_i) \cdot F_{i-1}, \text{ in which}$$

$i=\{1,2\}$ and $F_0=C_0$ and $A_0=1$, so:

$$F_0=C_0,$$

$$F_1=A_1 \cdot C_1 + (1-A_1) \cdot F_0,$$

$$F_2=A_2 \cdot C_2 (1-A_2) \cdot F_1.$$

Next, the formula to ultimately obtain $F_2$ from all known values is:

$$F_2 = A_2 \cdot C_2 + (1-A_2) \cdot (A_1 \cdot C_1 + (1-A_1) \cdot C_0).$$

In the last step, all products found in the formula are multiplied and put with the same factor before brackets:

$$F_2 = A_2 \cdot C_2 + (1-A_2) \cdot A_1 \cdot C_1 + (1-A_2) \cdot (1-A_1) \cdot C_0.$$

From this formula, three new variables are obtained:

$$D_2 = A_2 \cdot C_2,$$

$$D_1 = (1-A_2) \cdot A_1 \cdot C_1,$$

$$D_0 = (1-A_2) \cdot (1-A_1) \cdot C_0$$

in which $D_i$ is the final data for each pixel of each variant of i-th layer.

It can easily be demonstrated that the formula for $D_i$ for a greater number of n sorted layers is:

$$D_i = \prod_{j=i+1}^{n-1} (1-A_j) A_i C_i$$

To obtain the final color in each pixel, only the $D_i$ values need to be provided to an end-user's computer, and then add the above variables. In this manner, much less data is sent, for example, via the Internet or other networks, and much less computations are performed on the end-user's computer. In the case of changing a variant such as the color of a particular layer, the system need only downgrade the current final color with current $D_i$ value for i-th layer and add a new $D_i$ component representing another variant.

A third sector class specifies a sector of the scene that contains static and variable layers that have more than one shape. For static layers, RGB data is processed in the same way as in the case of the second sector class for processing an alpha of the static layers. However, in the case of variable layers, RGB data of variants must be multiplied with their alphas, and for each static layer that is situated above the particular variable layer, multiply with a factor (1−other_alpha), where other_alpha is an alpha of the static layer above. Furthermore, information is sent to an end-user's computer about a reciprocal position with all layers that appears in the same area, and self alpha. That data suffices for processing a final result, with a pre-multiplied RGB component added for a variable layer and multiple components of layers that are situated below the relevant variable layer.

The basic alpha compositing equation is transformed in the same manner as in case of the second sector class, except for two cases:

a) where the variable layer is displayed on scene; and
b) where the variable layer isn't displayed on scene.

Once all four layers are sorted based on their increasing z-depth values, a sequence of layers is obtained, in which the first layer will have index 0, the next layers will have indices 1 and 2, respectively, and the last layer has an index 3. Layers with indices 0, 2 and 3 are static layers, and the layer with the index 1 is a variable layer. In this case, based on the alpha compositing theorems, we get the following formulas, in which $F_i$ is a final color by applying the layer with the index i on the background processed from the layers with indices 0, 2, 3 and without the variable layer. $F_i'$ includes the variable layer with the index 1.

$$F_i = A_i \cdot C_i + (1-A_i) \cdot F_{i-1},$$

$i = \{1,2\}$ and $F_0 = C_0$ and $A_0 = 1$

Computing the values of $F_i$:

$$F_0 = C_0,$$

$$F_2 = A_2 \cdot C_2 + (1-A_2) \cdot F_0,$$

$$F_3 = A_3 \cdot C_3 + (1-A_3) \cdot F_2$$

Next, the formula for $F_3$ is written in terms of all known values:

$$F_3 = A_3 \cdot C_3 + (1-A_3) \cdot (A_2 \cdot C_2 + (1-A_2) \cdot C_0)$$

All products found in the formula above are multiplied, and the same factors are placed before the brackets:

$$F_3 = A_3 \cdot C_3 + (1-A_3) \cdot A_2 \cdot C_2 + (1-A_3) \cdot (1-A_2) \cdot C_0$$

From this formula, three variables are obtained:

$$D_3 = A_3 \cdot C_3,$$

$$D_2 = (1-A_3) \cdot A_2 \cdot C_2,$$

$$D_0 = (1-A_3) \cdot (1-A_2) \cdot C_0$$

in which $D_i$ is the final data for each pixel of each variant of i-th layer.

Computing the variables $F_i'$:

$$F_0' = C_0,$$

$$F_1' = A_1 \cdot C_1 + (1-A_1) \cdot F_0',$$

$$F_2' = A_2 \cdot C_2 + (1-A_2) \cdot F_1',$$

$$F_3' = A_3 \cdot C_3 + (1-A_3) \cdot F_2'$$

Next, a formula for $F_3'$ from all known values is obtained:

$$F_3' = A_3 \cdot C_3 + (1-A_3) \cdot (A_2 \cdot C_2 + (1-A_2) \cdot (A_1 \cdot C_1 + (1-A_1) \cdot C_0))$$

By multiplying all products found in the above formula and putting the same factors before brackets:

$$F_3' = A_3 \cdot C_3 + (1-A_3) \cdot A_2 \cdot C_2 + (1-A_3) \cdot (1-A_2) \cdot A_1 \cdot C_1 (1-A_3) \cdot (1-A_2) \cdot (1-A_1) \cdot C_0$$

From this formula, three variables are obtained:

$$D_3' = A_3 \cdot C_3,$$

$$D_2' = (1-A_3) \cdot A_2 \cdot C_2,$$

$$D_1' = (1-A_3) \cdot (1-A_2) \cdot A_1 \cdot C_1,$$

$$D_0' = (1-A_3) \cdot (1-A_2) \cdot (1-A_1) \cdot C_0$$

in which $D_i'$ is the final data for each pixel of each variant of i-th layer.

The formulas shown below present differences between collections of $D_i$ values and $D_i'$ values:

$$D_3(') = A_3 \cdot C_3,$$

$$D_2(') = (1-A_3) \cdot A_2 \cdot C_2,$$

$$D_1(') = (1-A_3) \cdot (1-A_2) \cdot A_1 \cdot C_1$$

$$D_0(') = (1-A_3) \cdot (1-A_2) \cdot (1-A_1) \cdot C_0$$

It can easily be demonstrated that the formula for $D_i$ for a greater number of n layers, that may be static or variable, is:

$$D_i = \prod_{j=i+1}^{n-1} (E_j(1-A_j)) A_i C_i$$

in which $E_i$ is a Boolean function such that, if the i-th layer is enabled at a particular time, then $E_i = 1$, and for static layers $E_i$ always returns the value 1. But if the i-th layer is disabled, then $E_j = 1 - A_j$.

Accordingly, the end-user's computer only needs to request and send for variants of any layer values $D_i$, but with one difference: for variable layers, the Boolean function $E_j$ will always return the value $(1-A_j)$ which is equivalent to an "initial state" value. In the case of enabling the i-th variable layer on a particular pixel, such that the layer appears at a particular time, the end-user's computer only needs to do multiplication of the factor $(1-A_i)$ with all the values $D_j$, in which $D_j$ represents data of a visible layer on the pixel that is positioned below a currently added layer and add the values $D_i$ for this added layer. However, if there are variable layers that are positioned above the added layer, multiplication is performed of the value $D_i$ with all factors $(1-A_j)$, in which j is the identifier of an enabled variable layer positioned above the currently added layer. Therefore, the end-user's computer only needs to request additional self-alpha values for variable layers.

Referring back to FIG. 5A, for each layer, the method then checks if the layer is static in step 504. If so, the method proceeds to steps 506-511 in FIG. 5B; otherwise, the method proceeds to steps 512-518 in FIG. 5C. After steps 511 and 518 in FIGS. 5B-5C, respectively, the method returns to step 505 in FIG. 5A to prepare and/or create the folders, images, and "Data.JSON" file of the processed packs.

Figure 5B:
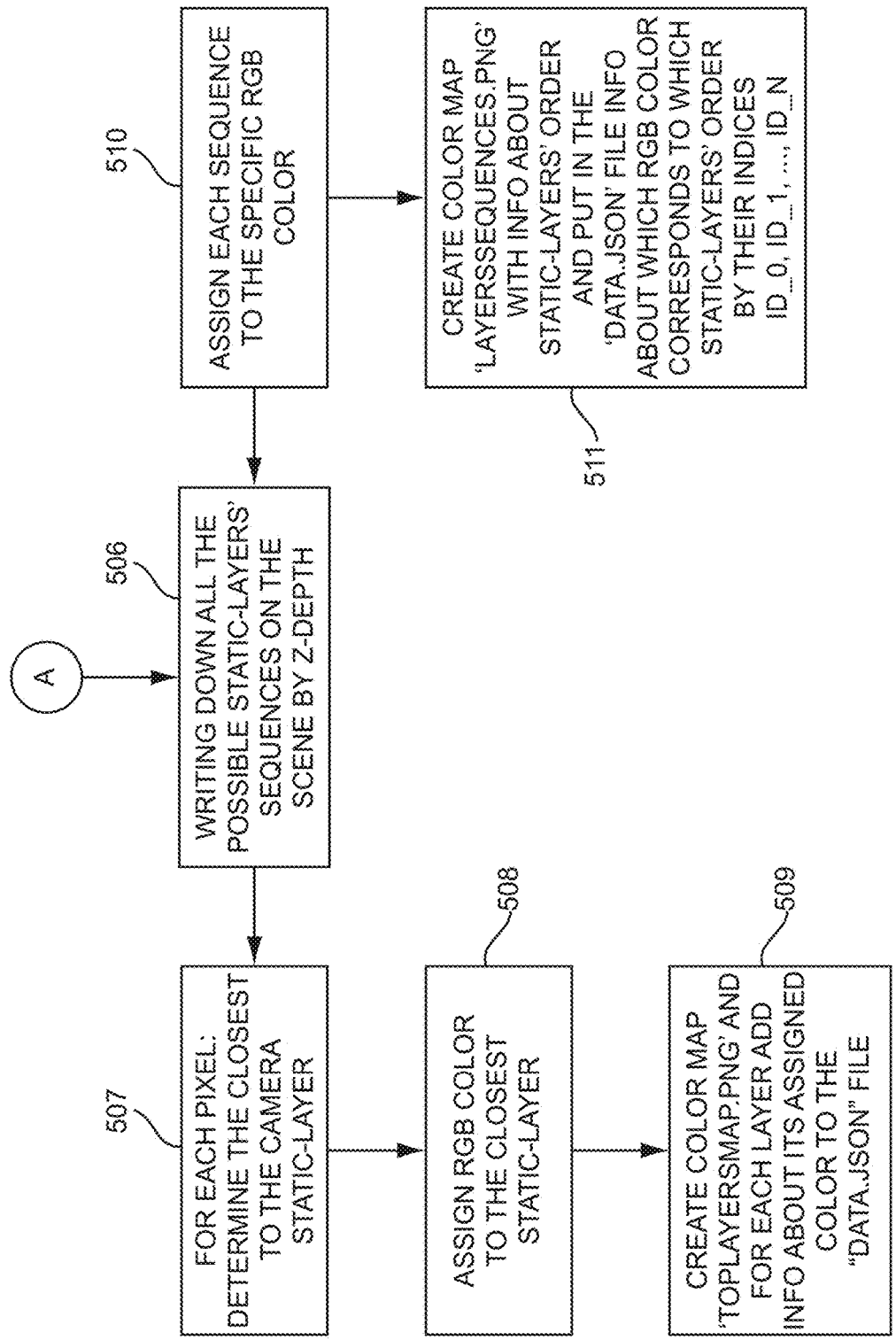
FIG. 5B is a flowchart of a method for processing static layers.

FIG. 5B is a flowchart of a method for processing static layers, which begins by writing down or otherwise listing in a memory all of the possible static layers' sequences on the scene by z-depth in step 506. Then, for each pixel, a static layer which is closest to the camera is determined in step 507, and an RGB color is assigned to the closest static-layer in step 508. Then, in step 509, a color map is created in a file named "Toplayersmap.png", and for each layer, information is added in the file "Data.JSON" about the assigned color of the layer. The method also assigns each sequence to a specific RGB color in step 510, and then in step 511, a color map is created in a file named "Layerssequences.png" with information about the order of the static layers, and information is put into the "Data.JSON" file about which RGB color corresponds to which static layers' order by their indices ID_0, ID_1, . . . ID_N. Then the method in FIG. 5B returns to perform step 505 in FIG. 5A.

Figure 5C:
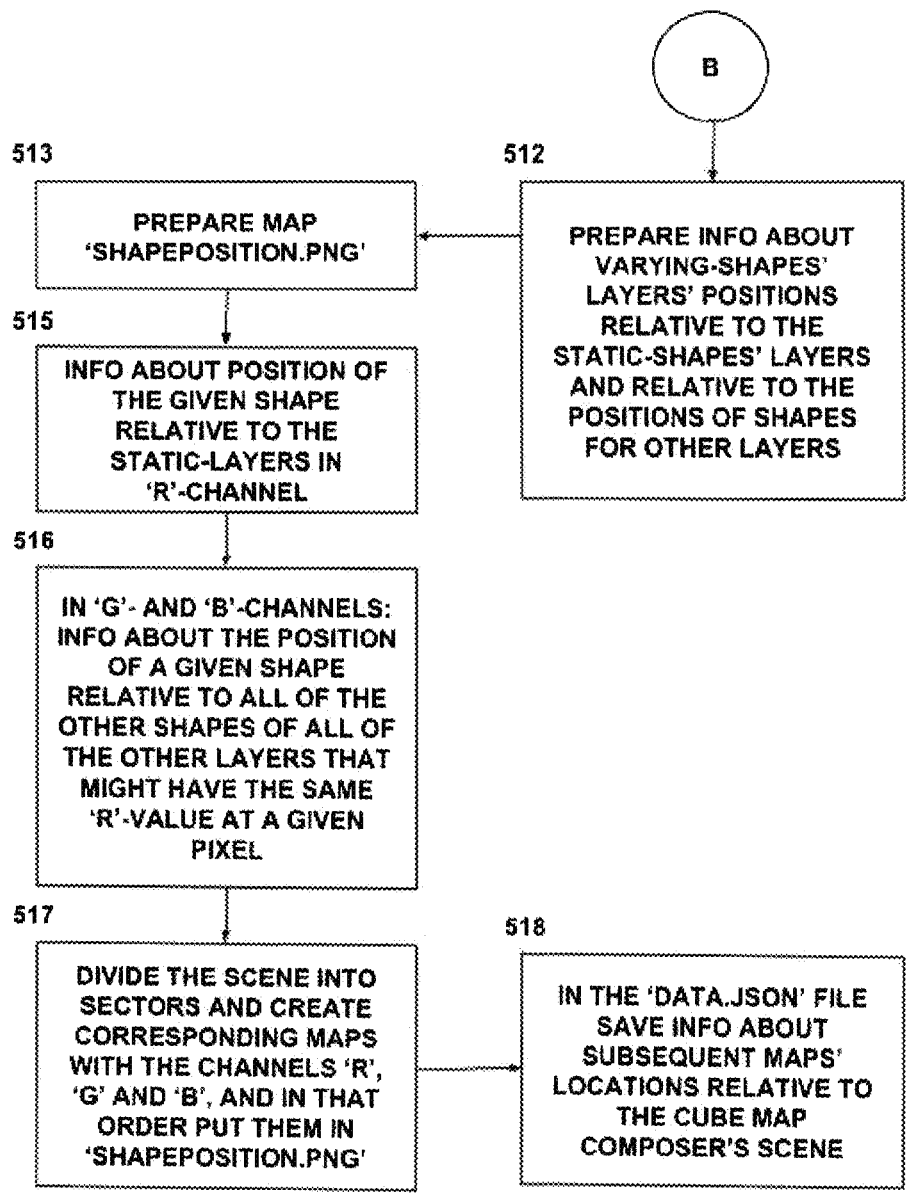
FIG. 5C is a flowchart of a method for processing varying layers.

FIG. 5C is a flowchart of a method for processing varying layers, which starts in step 512 with preparing information about the positions of the layers of varying shapes relative to the layers of the static shapes, and relative to the positions of shapes for other layers. The method then prepares a map in a "Shapeposition.png" file in step 513, and information about the position of a given shape relative to the static layers is placed in the R-channel of the RGB data in step 515. In step 516, information about the position of a given shape relative to all of the other shapes of all of the other layers that might have the same R-value at a given pixel is placed in the G-channel and the B-channel. Then in step 517, the scene 110 is divided into sectors, and maps are created with the R, G, and B channels, and in that order, the maps are put in a "shapeposition.png" file. The method then saves information, in step 518, in the "Data.JSON" file about locations of subsequent maps relative to the cube map composer's scene. Then the method in FIG. 5C returns to perform step 505 in FIG. 5A.

FIG. 6 is a flowchart of a method for preparing images for varying layers. The method starts in step 601, and chooses the size of a sector of a scene in step 602. In the post-processing of the raw pack of images, the available space of the cube map composer's scene is divided into sectors in step 602. Then, in step 603, for each shape of each layer, the appearance of the shape in the subsequent sectors is checked, and the files corresponding to the layers is divided into the created sectors. The raw pack data is finally composed in step 603 into separate files only for such sectors in which a given layer is present. The size of the sector can be chosen by a user from one of a plurality of predetermined values. The size settings for sectors is accessible via a persistent panel of a GUI.

In step 604, for each shape, a JPG file is created, and subsequently all of the sectors are put in the JPG file in which a given shape is present, and then the RGB channels are multiplied by factors that depend on the alpha value of a given layer and on alpha values of the static layers above a given layer. The corresponding image, representing the objects in the scene 110 composed of the layers 112, 114, 116, is changed by multiplying RGB colors by factors depending on each layer's own alpha channel values and on the alpha channel values of the other layers according to predetermined mathematical formulas, as described in step 604. The purpose of performing such dividing and separating the raw pack of data into separate files is to considerably reduce the total size of the pack, and also the size of particular files corresponding to individual layers.

Then in step 605, for each shape, information about the location of the subsequent sectors in a final scene relative to the cube map composer's scene is saved in the "Data.JSON" file as a processed pack of images, and the method ends in step 606.

Figure 7:
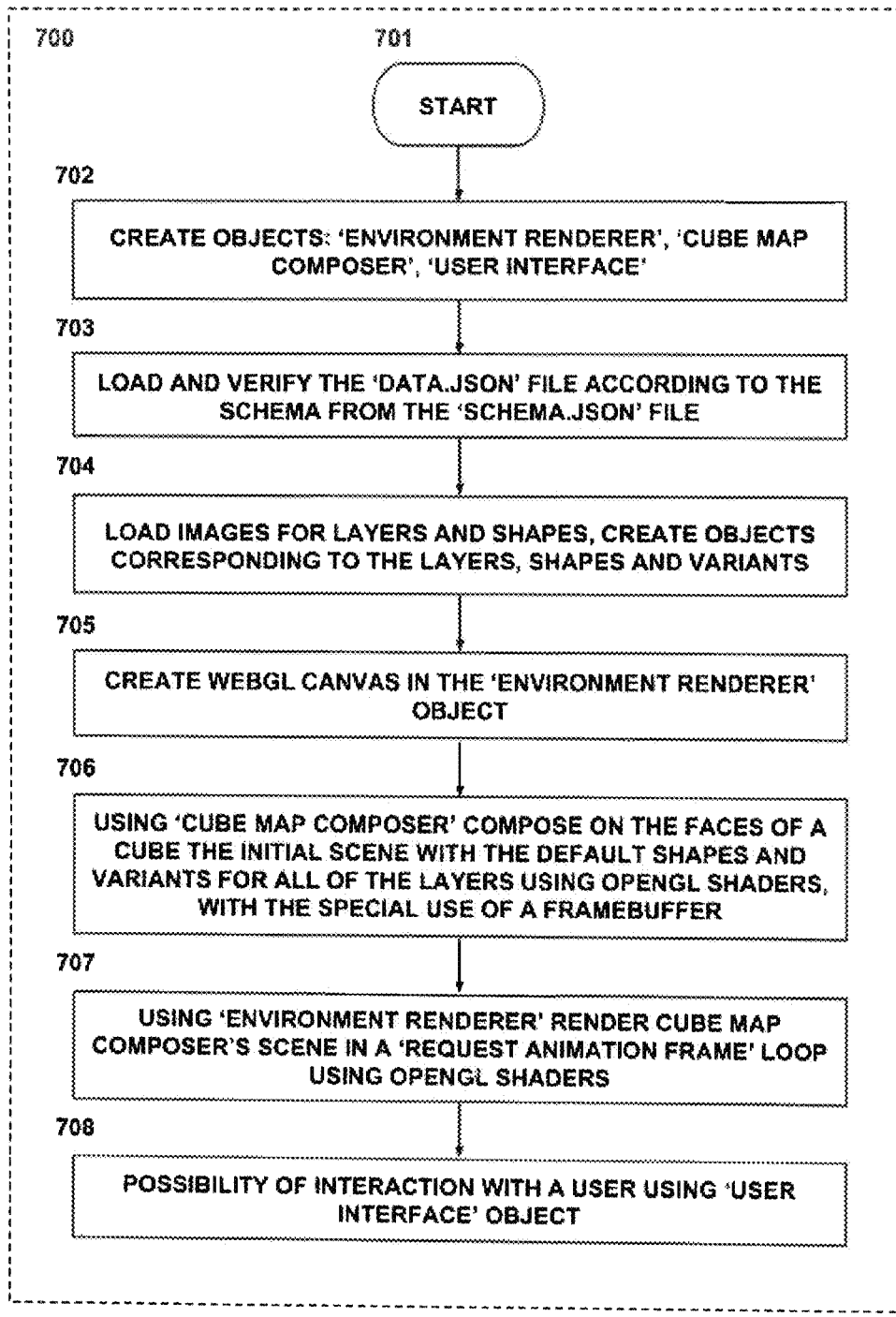
FIG. 7 is a flowchart of a method for displaying images.

FIG. 7 is a flowchart of a method 700 for displaying images based on the pack of images processed in the method 600 of FIG. 6. The method 700 starts in step 701, and creates objects such as "environment renderer", "cube map composer", and "user interface" in step 702. In step 703, the method 700 loads and verifies the "Data.JSON" file into the server 203 in FIG. 2, according to a schema from a "Schema.JSON" file. The verification checks the integrity of the data in the "Data.JSON" file. In step 704, images are loaded for layers and shapes, and objects are created corresponding to the layers, shapes, and variants. Such loading of images is performed by downloading the data in the "Data.JSON" file to the client; that is, to one of the user devices 60, 70, 80 in FIG. 1.

The user devices 60, 70, 80 use a main computer program written in the Javascript and WebGL programming languages, which makes it possible to display the image data 29 on the respective displays 61, 71, 81 in the respective browser 62, 72, 82 on the respective user device 60, 70, 80. In step 705, the method 700 creates a WebGL canvas in the "environment renderer" object, and in step 706, the "cube map composer" object is used to compose the initial scene on the faces of a cube with the default shapes and variants for all of the layers using OpenGL shaders, with a special use of a framebuffer. The cube map composer's scene is rendered in step 707 using the "environment renderer" object in response to being requested in a "request animation frame" loop using OpenGL shaders. The rendering in step 707 is performed in real-time on one or more of the respective displays 61, 71, 81 in the respective browser 62, 72, 82 using communications with a GPU using the OpenGL language, and also using communications with an end server, such as one or more of the render servers 32, 34, using an Asynchronous Javascript and XML (AJAX) protocol, in the case when a data download is needed to receive and render the images.

The method 700 then optionally interacts with a user using the "user interface" object on the respective displays 61, 71, 81 in the respective browser 62, 72, 82 in step 708. For example, in response to an end-user's request in step 106 in FIG. 1A, the following interactions may be performed: moving a scene, rotating a scene in 3D, zooming into an image, changing a shape and/or a variant for chosen layers, switching between different camera views, reloading a scene for another view of the scene, highlighting the chosen layers, transitioning between different variants of layers during a variant and/or a camera change, and adding tags to chosen layers, such as layers and/or objects therein selected by a user through the browser 62, 72, 82, which implements a graphical user interface (GUI).

Figure 8:
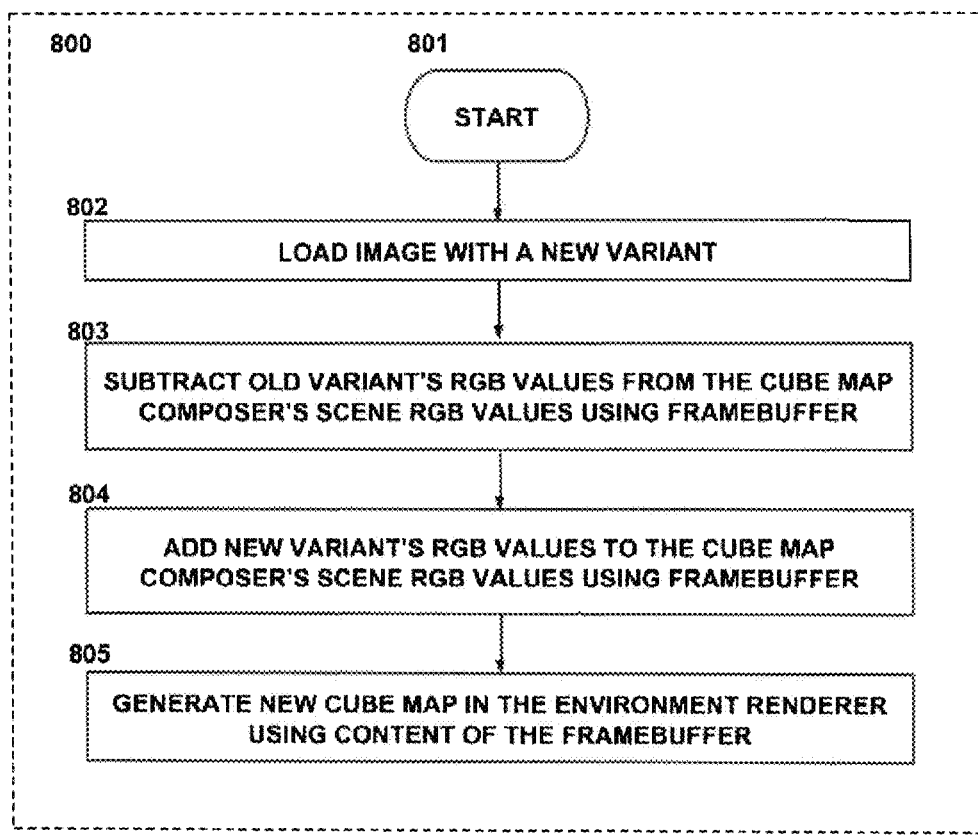
FIG. 8 is a flowchart for a method for changing variants for static layers.
Figure 9A:
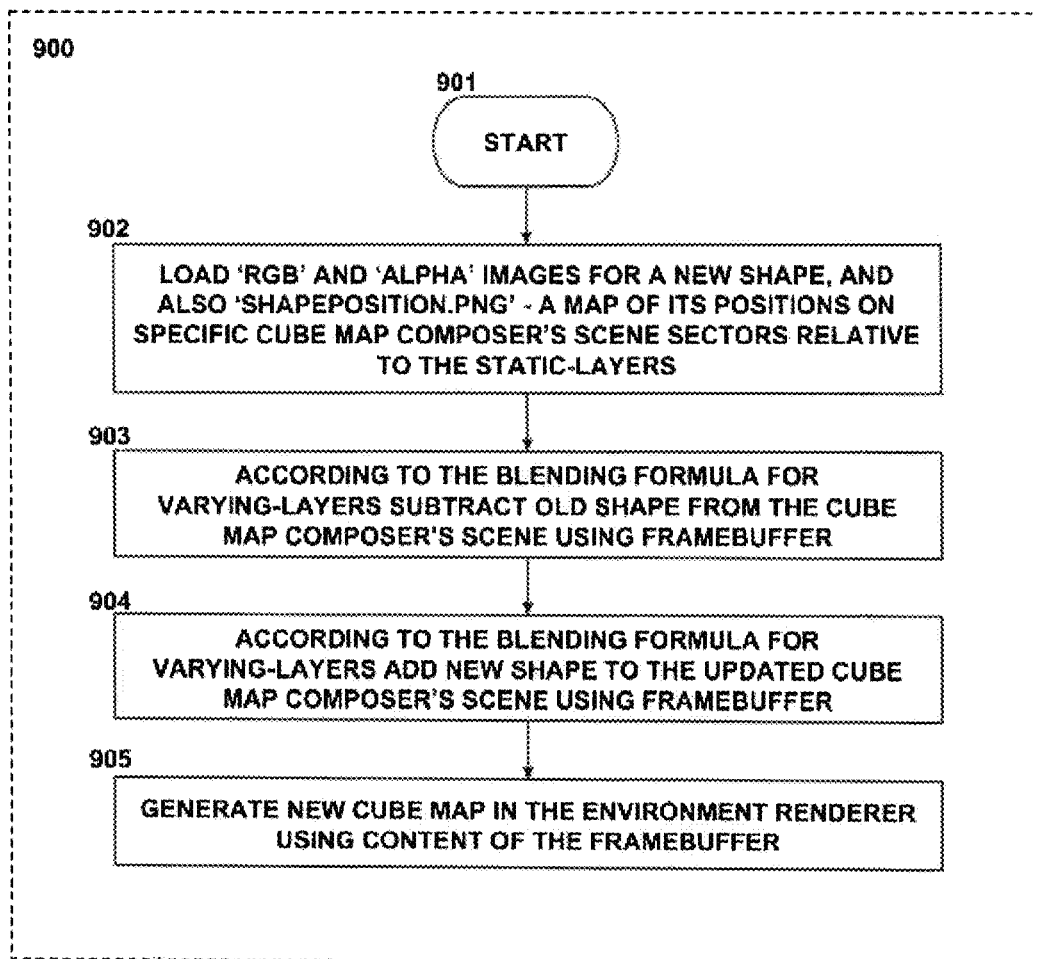
FIG. 9A is a flowchart for a method for changing shapes for varying layers.
Figure 9B:
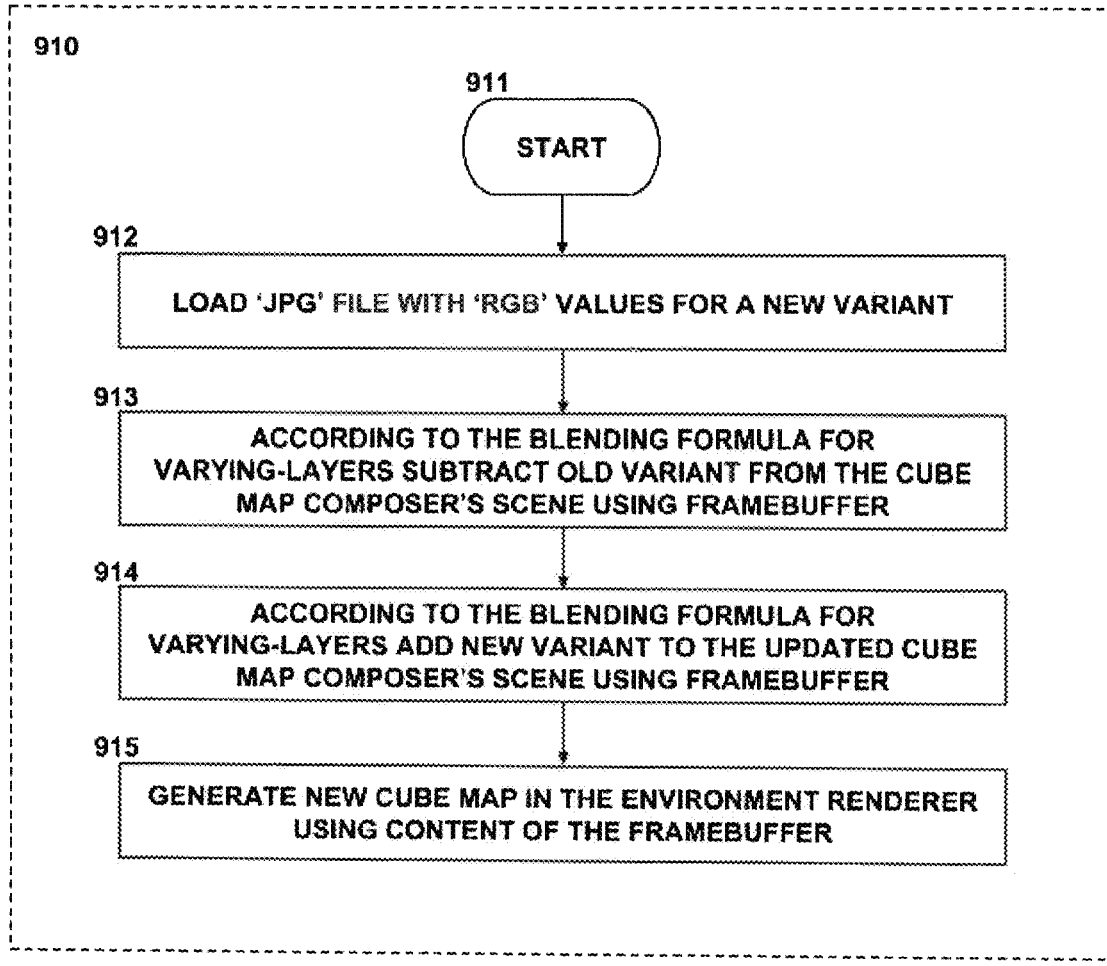
FIG. 9B is a flowchart for a method for changing variants for varying layers.

FIGS. 8-9B show the processing of shape and/or variant changes for chosen layers in greater detail. FIG. 8 is a flowchart for a method 800 of changing variants for static layers, which starts in step 801, and loads an image with a new variant in step 802. The method 800 then subtracts the RGB values of an old variant from the cube map composer's scene RGB values using a framebuffer in step 803. In step 804, the RGB values of the new variant are added to the RGB values of the cube map composer's scene using the framebuffer, and a new cube map is generated in the environment renderer in step 805 using the contents of the framebuffer.

FIG. 9A is a flowchart for a method 900 of changing shapes for varying layers, which starts in step 901, and then in step 902, the method 900 loads "RGB" and "alpha" images for a new shape, and also loads a "Shapeposition.png" file to map the positions of the new shape on specific cube map composer's scene sectors relative to the static layers. In step 903, a blending formula for varying layers is used to subtract an old shape from the cube map composer's scene using a framebuffer. Then in step 904, the blending formula for the varying layers is used to add the new shape to the updated cube map composer's scene using the framebuffer, and, in step 905, a new cube map is generated in the environment renderer using the contents of the framebuffer.

FIG. 9B is a flowchart for a method 910 of changing variants for varying layers, which starts in step 911, and loads a "JPG" file with "RGB" values for a new variant in step 912. Then the blending formula for varying layers is used in step 913 to subtract an old variant from the cube map composer's scene using the framebuffer, and the blending formula for varying layers is used in step 914 to add a new variant from the cube map composer's scene using the framebuffer. A new cube map is generated in the environment renderer in step 915 using the contents of the framebuffer.

The present invention may be embodied in other specific forms without departing from its spirit or essential characteristics. The described embodiments are to be considered in all respects only as illustrative and not restrictive. The scope of the invention, therefore, will be indicated by claims rather than by the foregoing description. All changes, which come within the meaning and range of equivalency of the claims, are to be embraced within their scope.

What is claimed is:

1. A system comprising:
   a workstation including a first processor executing graphical software instructions for receiving an input, for generating image data from the received input, and for transmitting the image data;
   a render server including a second processor for:
   receiving the image data;
   generating a graphical file from the received image data including:
      deriving distinct data from an alpha image, a z-depth image, and red-green-blue (RGB) variants of the image data;
      minimizing the distinct data by: (i) slicing the alpha image, the z-depth image and the RGB variants; (ii) discarding unused parts thereof such that only used parts remain; and (iii) slicing the remaining used parts into a minimal sets;
   deriving shading data from the image data; and
   combining the minimized distinct data and the shading data to generate an optimized data package in the graphical file; and
   transmitting the graphical file; and
   a user device remote from the render server, wherein the user device includes a third processor and a display operating a browser, wherein the third processor receives the graphical file and renders the image data in the browser using the graphical file.

2. The system of claim 1, wherein the user device is selected from a group consisting a personal computer, a mobile computing device and a wearable viewing device.

3. The system of claim 1, wherein the workstation includes:
   a memory storing a plurality of image shapes; and
   wherein the input includes a selection of an image shape from the plurality of image shapes.

4. The system of claim 3, wherein the image data specifies a plurality of layers including a plurality of selected image shapes, with at least one selected image shape disposed in a corresponding layer.

5. The system of claim 4, wherein the user device further comprises:
   a compositing sub-system for rendering the image data in the browser by reconstructing, from the optimized data package, the plurality of layers with the plurality of selected image shapes disposed in corresponding layers.

6. The system of claim 4, wherein each of the plurality of selected image shapes has a respective alpha image, a respective z-depth image, and a respective plurality of RGB variants.

7. A user device comprising:
   a first processor remote from a render server for receiving a graphical file from the render server, wherein the render server includes a second processor for:
   receiving image data;
   generating the graphical file from the received image data including:
      deriving distinct data from an alpha image, a z-depth image, and red-green-blue (RGB) variants of the image data;
      minimizing the distinct data by: (i) slicing the alpha image, the z-depth image and the RGB variants; (ii) discarding unused parts thereof such that only used parts remain; and (iii) slicing the remaining used parts into a minimal sets;
   deriving shading data from the image data; and
   combining the minimized distinct data and the shading data to generate an optimized data package in the graphical file; and
   transmitting the graphical file; and
   a display operating a browser;
   wherein the first processor receives the graphical file and renders the image data in the browser on the display.

8. The user device of claim 7, wherein the user device is selected from a group consisting a personal computer, a mobile computing device and a wearable viewing device.

9. The user device of claim 7, wherein the render server is operatively connected to a workstation which includes:
   a memory storing a plurality of image shapes; and
   an input device for receiving an input which includes a selection of an image shape from the plurality of image shapes.

10. The user device of claim 9, wherein the image data specifies a plurality of layers including a plurality of selected image shapes, with at least one selected image shape disposed in a corresponding layer.

11. The user device of claim 10, wherein the first processor further comprises:
a compositing sub-system for rendering the image data in the browser by reconstructing, from the optimized data package, the plurality of layers with the plurality of selected image shapes disposed in corresponding layers.

12. The user device of claim 10, wherein each of the plurality of selected image shapes has a respective alpha image, a respective z-depth image, and a respective plurality of RGB variants.

13. A method comprising:
executing graphical software instructions on a first processor of a workstation;
receiving an input through an input device of the workstation;
generating image data from the received input using the first processor;
transmitting the image data from the first processor;
receiving the image data at a second processor of a render server;
generating a graphical file from the received image data using the second processor, including:
deriving distinct data from an alpha image, a z-depth image, and red-green-blue (RGB) variants of the image data;
minimizing the distinct data by: (i) slicing the alpha image, the z-depth image and the RGB variants; (ii) discarding unused parts thereof such that only used parts remain; and (iii) slicing the remaining used parts into a minimal sets;
deriving shading data from the image data; and
combining the minimized distinct data and the shading data to generate an optimized data package in the graphical file;
transmitting the graphical file using the second processor;
receiving the graphical file of a user device remote from the render server, wherein the user device includes a third processor and a display operating a browser; and
rendering, using the third processor, the image data in the browser using the graphical file.

14. The method of claim 13, further comprising:
storing a plurality of image shapes in a memory of the workstation; and
wherein the input includes a selection of an image shape from the plurality of image shapes.

15. The method of claim 14, wherein the image data specifies a plurality of layers including a plurality of selected image shapes, with at least one selected image shape disposed in a corresponding layer.

16. The method of claim 15, further comprising:
rendering the image data in the browser of the user device using a compositing sub-system of the third processor by reconstructing, from the optimized data package, the plurality of layers with the plurality of selected image shapes disposed in corresponding layers.

* * * * *